(12) United States Patent
Degner et al.

(10) Patent No.: US 7,339,345 B2
(45) Date of Patent: Mar. 4, 2008

(54) POWER CONVERTER TOPOLOGIES FOR BETTER TRACTION DRIVE PACKAGING

(75) Inventors: Michael Degner, Novi, MI (US); Venkateswa Sankaran, Farmington Hills, MI (US); Chingchi Chen, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 47 days.

(21) Appl. No.: 11/345,551

(22) Filed: Jan. 31, 2006

(65) Prior Publication Data

US 2007/0176574 A1   Aug. 2, 2007

(51) Int. Cl.
*H02P 27/04* (2006.01)
(52) U.S. Cl. ............... 318/800; 318/254; 318/138; 318/439; 318/801
(58) Field of Classification Search ........... 318/800, 318/254, 138, 439, 801, 794, 795, 802, 811, 318/817, 432, 433
See application file for complete search history.

(56) References Cited

U.S. PATENT DOCUMENTS

| 3,644,807 | A | * | 2/1972 | Zajac | 318/138 |
| 4,054,818 | A | * | 10/1977 | Risberg | 318/807 |
| 5,055,758 | A | * | 10/1991 | Hock | 318/645 |
| 2002/0121901 | A1 | * | 9/2002 | Hoffman | 324/426 |

* cited by examiner

*Primary Examiner*—Karen Masih
(74) *Attorney, Agent, or Firm*—David B. Kelley, Esq.; Tung & Associates

(57) ABSTRACT

At least three alternative stiff current supply power converter topologies provide fixed current to a respective electric load such as a motor, or a non-inductive electric load using either a current source or a pseudo current source. The stiff current power converter topologies reduce the size of passive components within each of the topologies, thus reducing the overall packaging of each of the components and subsystems formed by each of the components. Each of the topologies have a stiff current source, a driver having power electronics formed therein to drive the associated electric load, wherein the stiff current source and the driver operate to deliver a stiff but controllable current to the electric load.

16 Claims, 2 Drawing Sheets

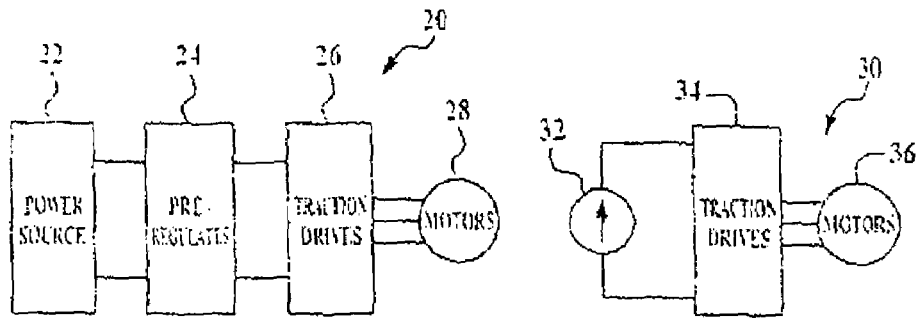
Figure 1 —PRIOR ART—
Figure 2A
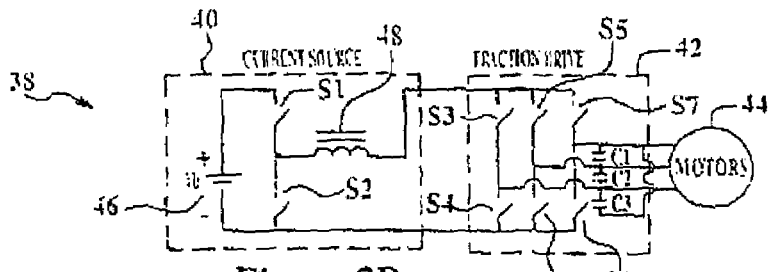
Figure 2B
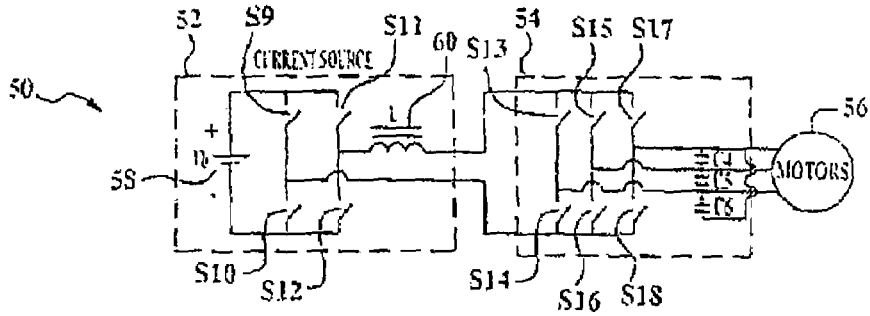
Figure 2C
Figure 2D

POWER CONVERTER TOPOLOGIES FOR BETTER TRACTION DRIVE PACKAGING

FIELD OF THE INVENTION

The present invention generally relates to power converter topologies for use in the field of delivering a stiff current power source or a pseudo stiff current power source to an electric load.

With very few exceptions, motor drives are designed based on stiff voltage sources, where the power sources are provided with small internal impedance, which hold a bus voltage steady even with substantial load current fluctuation. A stiff voltage power supply provides a constant voltage to a motor driver that remains constant independent of load demands on the driver. The benefits of this approach include simple topology, simple control requirements, and fast responses.

Prior art FIG. 1 shows a functional block diagram of a voltage source topology 20 having a stiff voltage power supply or source 22, an inverter, which may be in the form of a traction drive, 26, and a motor 28.

Additionally, motor drives based on stiff voltage sources similar to the topology shown in FIG. 1 are typically associated with non-conforming events such as short-circuit currents—which may allow unwanted transients to damage an electronic circuit. A short circuit may be formed when the voltage remains constant, and the resistance may be negligible, thus allowing the current to rapidly increase and form a short circuit between a negative and a positive terminal of the stiff voltage power supply.

While existing devices suit their intended purpose, the need remains for a device and method that uses a stiff current supply topology to provide a—controllable current to a load, and that allows for flexible packaging options to efficiently package components located within the stiff current supply topology.

SUMMARY

In one aspect of the technology, a device and method is provided that uses a stiff current supply topology to provide a controllable current to a load, and that allows for flexible packaging options to efficiently package components located within the stiff current supply topology.

In an aspect of the technology, a current source power converter topology delivers a stiff current source to power an electric load. The topology has a driver with power electronics to drive the load and at least one capacitor coupled to the load and to the power electronics to prevent transients from damaging the current source power converter.

In another aspect of the technology, a pseudo current source power converter topology delivers power to an electric load using a pseudo current source to power the electric load formed from a stiff voltage source and a first capacitor, and an inductor coupled in series with the stiff voltage source and further in series with the first capacitor to hold a current delivered to the electric load stiff. A driver having power electronics drives the electric load and has two switches and a second capacitor, wherein the two switches alternate between open and closed positions to regulate the voltage on the second capacitor.

A pseudo current source power converter topology having an electric load, and a battery formed from a voltage source connected to a first capacitor packed in a first package; an inductor coupled in series with the battery, wherein the inductor operates to an electric load; a battery formed from a voltage source and a first capacitor connected in parallel with the voltage source, wherein the battery has an associated first package; an inductor coupled in series with the battery within a second package, and a combination electric load and associated driver packaged within a third package and cooperates with the battery and the inductor to provide a stiff but controllable current to the electric load.

A method of using each of the topologies is also provided.

BRIEF DESCRIPTION OF THE DRAWINGS

These and other objects, features and advantages of the present invention will become apparent from the following detailed description and the appended drawings in which:

FIG. 1 illustrates a functional block diagram of a prior art voltage source topology.

FIG. 2a illustrates a functional block diagram of a current source power converter topology system having a stiff current source, an electric subsystem or power electronics, and a motor in accordance with one aspect of the technology.

FIG. 2b illustrates detailed schematics of a current source power converter topology that provides a current source, power electronics, and a motor in accordance with one aspect of the technology.

FIG. 2c illustrates detailed schematics of a current source power converter topology that provides a current source, power electronics, and a motor in accordance with one aspect of the technology.

FIG. 2d illustrates detailed schematics of an alternative current source power converter topology system having a pseudo current source, power electronics and a motor in accordance with one aspect of the technology.

DETAILED DESCRIPTION OF THE INVENTION

The present area of technology relates to use of current source topologies that provide stiff current source or pseudo current sources to deliver a stiff but controllable current to a load. The current source topologies of the present area of technology operate to keep a current delivered to the load stiff but controllable, independent of the load demands. In each of the topologies of the disclosed herein, a source is provided that operates to hold electric current stiff throughout the current source system. The benefits of each of the current source or pseudo current sourced topologies eliminate the effect of potential short-circuit non-conforming events that, without the use of the present area of technology, may operate to damage the associated electronics.

Figure 2E:
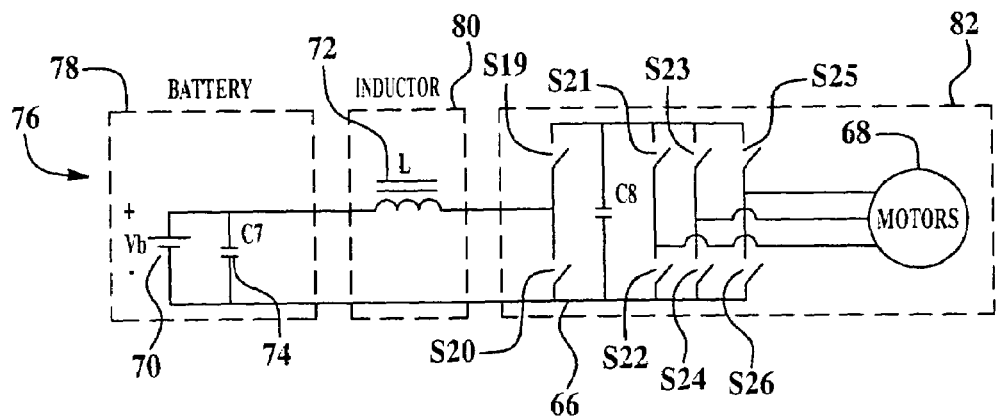
FIG. 2e illustrates detailed schematics of an alternative current source power converter topology similar to the current source power converter topology disclosed in FIG. 2d, wherein a pseudo current source is provided as a battery and an inductor that are each packaged separately in accordance with one aspect of the technology.

Referring now to the drawings, in particular, FIG. 2a illustrates a functional block diagram of a current source power converter topology system 30 having a stiff current source 32, an electric subsystem or power electronics 34, and a load 36. The load 36 may be any electric load such as, but not limited to an electric motor, a DC load, and a non-inductive load. As shown in FIGS. 2b-2g, the load 36 is provided for illustrative purposes as a three-phase electric motor. Additionally, the power electronics shown in FIGS. 2b-2g each operate to drive the motor and further provide a plurality of switches, shown as six switches, in each of the schematics that cooperate to control the motor using a technology such as pulse width modulation (PWM) scheme as is known in the art and as is described in detail in U.S. Pat. No. 4,511,835, which is herein incorporated by reference. The six switches are shown as switches S3-S8 in FIG. 2b; switches S13-S18 in FIG. 2c; and switches S21-S26 in FIGS. 2d-2e.

An application of the present area of technology shown in FIGS. 2a-2g may be used in many applications that have come or may come into existence requiring stiff but controllable current delivery to a load. An example of such an application may be, but is not limited to use of the present area of technology in a vehicle such as a hybrid or parallel hybrid electric vehicle having traction control, wherein the load 36 may be an electric traction motor, and wherein the power electronics 34 may be a traction drive. While many other applications may exist for the present technology, as used herein for illustrative purposes with reference to FIGS. 2b-2g, the power electronics of each of the disclosed current and pseudo source power converter topologies is a traction drive defined by an associated power converter or power electronics and the load is an electric traction motor.

Figure 2F:
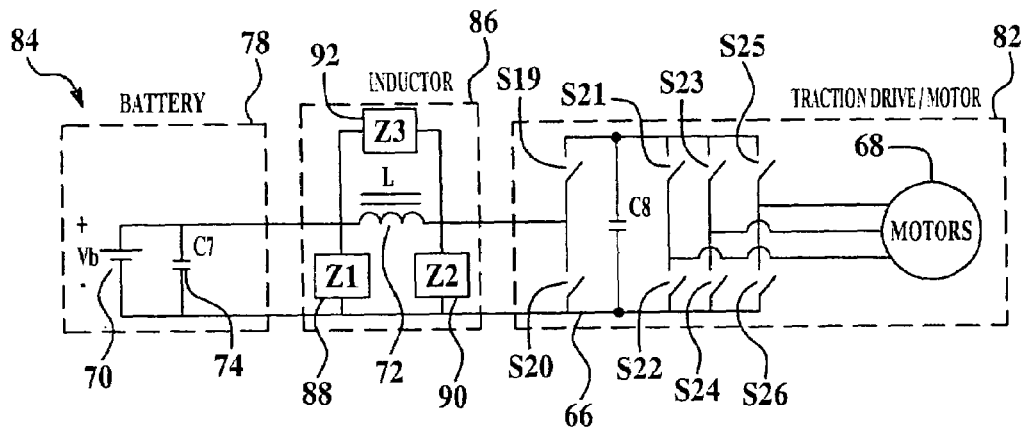
FIG. 2f illustrates detailed schematics of another current source power converter topology similar to the current source power converter topology disclosed in FIG. 2e, further having suppressors in communication with the separately packaged inductor to prevent arcing within the current topology in accordance with one aspect of the technology.
Figure 2G:
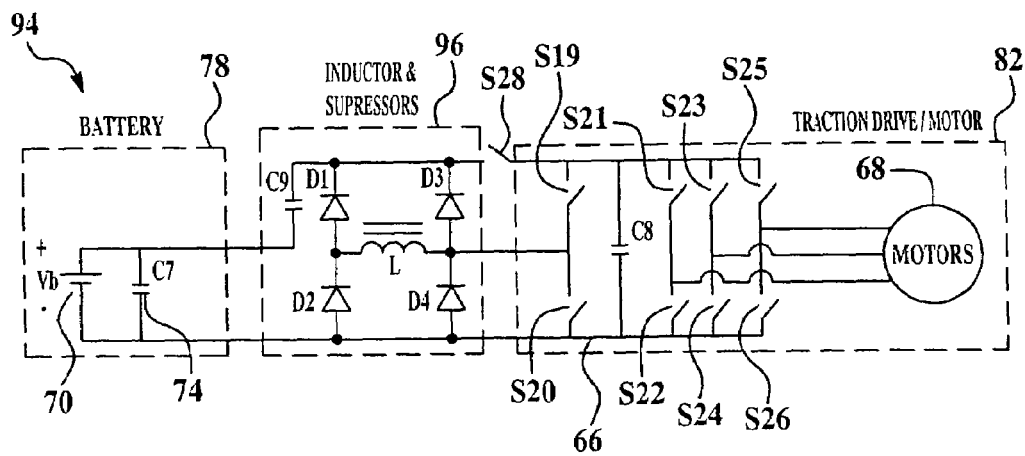
FIG. 2g illustrates detailed schematics of another current source power converter topology similar to the current source power converter topology disclosed in FIG. 2e further providing rectification means in communication with the separately packaged inductor to prevent arcing within the current source power converter topology in accordance with one aspect of the technology.

FIGS. 2b-2g illustrate alternative detail views of the schematics that may be used to define each of the elements 32, 34, 36 disclosed in the power converter topology 30 shown in FIG. 2a. More particularly, FIGS. 2b-c illustrate detailed schematics of two alternative current source power converter topologies that each provide a current source, power electronics, and a motor. FIG. 2d illustrates detailed schematics of an alternative current source power converter topology system having a pseudo current source, power electronics and a motor. FIG. 2e illustrates detailed schematics of an alternative current source power converter topology similar to the current source power converter topology disclosed in FIG. 2d, wherein a pseudo current source is provided as a battery and an inductor that are each packaged separately. FIG. 2f illustrates detailed schematics of another current source power converter topology similar to the current source power converter topology disclosed in FIG. 2e, additionally having alternative suppressors in communication with the separately packaged inductor. FIG. 2g illustrates detailed schematics of another current source power converter topology similar to the current source power converter topology disclosed in FIG. 2e further providing rectification means in communication with the separately packaged inductor to prevent arcing within the current topology. Like elements shown in each of the respective FIGS. 2b-2g will be referred to with corresponding like reference numbers.

FIG. 2b illustrates a schematic of a current source power converter topology 38 having a stiff current source 40, power electronic's 42, and a motor 44, wherein the power electronics 42 operate to deliver power to the motor 44. The stiff current source 40 integrates a preregulator, with a voltage source, wherein the preregulator and the voltage source cooperate to form the current source 40.

The stiff current source provides a voltage source 46, an inductor 48 in electrical communication with the voltage source, a first switch S1, and a second switch S2, wherein S1 and S2 alternate between alternating open and closed positions and cooperate with the voltage source 46 and the inductor 48 to deliver stiff but controllable current to the motor. S1 and S2 each respectively may be coupled to the inductor 48 and are used to control the amount of current flowing through the inductor 48. By switching S1 on when S2 is off, and then by switching S1 off and S2 on, the current delivered to the motor can be controlled. Determination of the current flowing through the current source power converter topology 38 may be based on known motor parameters, such as delivered torque, or alternatively, may be measured by current measuring means known in the art such as, but not limited to a shunt, or a current sensor.

In operation, initially, S1 is closed, and S2 is opened. When S1 is closed, and thus, S2 is open, S1 is connected in series with the voltage supply and the inductor 48 to provide a current I1 through the inductor 48 which stores energy in a magnetic field and then delivers a current I3 to the motor. When S1 is opened and S2 is closed, the source of current supplied by the voltage source 46 is eliminated and the inductor sources the stored energy as the current I3 defined by an inductance (L) of the inductor multiplied by a change in an instantaneous current divided by a change in time (L*di/dt). When the switch S1 is opened, and the switch S2 is closed, a current I2 flows from the inductor 48 to deliver the current I3 to the motor. The path of the currents I2 and I3 flowing through the system when S2 is closed forms a closed loop through the inductor and the motor, thus, eliminating the voltage supply from the loop. Once the current I3 drops below a predetermined minimum threshold, the switch S1 closes and the switch S2 opens and the cycle repeats when the current sourced exceeds a predetermined maximum threshold keeping the current stiff but controllable. Thus, the inductor 48 operates to smooth out or regulate transient current flowing through the power converter topology. Optionally, capacitors C1-C3 may be provided to suppress transient currents occurring during cycling of the motor.

FIG. 2c illustrates an alternative aspect shown as 50 of the current topology disclosed in FIG. 2b. FIG. 2c illustrates use of a current source 52 defined by voltage source 58, an inductor 60, and four switches S9-S12 that cooperate to provide a stiff but controllable current to the traction device. When closed, switches S10 and S11 function in a similar manner to the switches S1 and S2 shown in FIG. 2b. Additionally, switches S9 and S12 provide a negative voltage current source. Switches S13-S18 operate in a similar manner to the switches S3-S8 shown in FIG. 2b. Also, capacitors C4-C6 operate in a similar manner to capacitors C1-C3 to suppress transient currents occurring during cycling of the motor.

While the present area of technology illustrates use of a motor, a non-inductive load may be used as an alternative load. When a noninductive load replaces the motor, then optionally, each of the three capacitors C1, C2, C3 or C4, C5, C6 (as shown in FIG. 2c) may be eliminated from the current source system shown in both FIGS. 2b-2c.

FIG. 2d illustrates a schematic of a pseudo current source power converter topology 62 driving a traction drive having power electronics 66 with pre-regulation capability. FIG. 2d shows a bulky inductor 72 typically associated with a boost converter, and integrated with a voltage source 70, thus, operating as pseudo current source 64. The topology shown in FIG. 2*d* is considered as a pseudo current source because, the inductor 72 operates to hold the current stiff but controllable during transients, which is the signature of a current source. The combination of a battery and an inductor cannot regulate the steady state current, therefore, the topology shown in FIG. 2*d* is considered a pseudo-current source power converter topology.

FIG. 2*d* shows a pre-regulator stage comprised of S19 and S20 to regulate the inductor current and the energy to C8. The method of regulating the inductor current initially allows current to flow into the inductor 72 by opening and closing a pair of switches S19 and S20. Initially, S19 is open and S20 is closed. As current flows through the inductor 72, magnetic energy is stored in the inductor 72. When the switch S20 opens and S19 is closed, the inductor 72 discharges the energy stored into the capacitor C8 and operates to charge the capacitor C8. The voltage Vc8 measured across the capacitor C8 is equal to a voltage Vb measured across the voltage source 70 plus a voltage $V_L$ measured across the inductor 72 when S20 opens where $V_L$ equals L*(di/dt). Thus, due to the voltage boost properties of the boost converter, a voltage across the capacitor C8 will be at a higher voltage then the source Vb. Capacitor C7 is used to provide transient current to the inductor 72. The inductor 72 stores current, and the stored current becomes a current source, and wherein C8 has a higher voltage than $V_b$ across the voltage source 70 this combination cooperates to form a pseudo-current source.

In FIG. 2*d*, a pseudo current source system 62 is provided and has a voltage source 70, an inductor 72 coupled in series with the voltage source 70, and a capacitor C7 connected in parallel with the voltage source 70 and shares a common node with the inductor 72. The voltage source 70, the capacitor C7 and the inductor 72 are grouped together in a single package or housing 74 and may be considered a pseudo-current source. Typically, the current source 52 shown in FIGS. 2*b* and 2*c* having a power source with integrated switches and an integrated inductor are difficult to be placed within a vehicle. A battery 78 typically would not be packaged with switches and electronics. With inductor 72 in a location separate from the power electronics portion of the traction drive 66, the traction drive 66 can be packaged in a more compact manner, thus allowing more freedom in determining packaging designs.

FIG. 2*e* illustrates a pseudo current source power converter topology 76 that operates in a similar manner to the topology shown in FIG. 2*d*, however the inductor 72 is packaged within packaging 80, separate from a battery 78 formed by the voltage source 70 and the capacitor C7 connected in parallel. In some applications, such as in a motor vehicle, packaging the inductor 72 in the same package as the battery 78 might not be feasible. Thus, if the battery 78 cannot accommodate the inductor 72 in the same package, the inductor may be packaged alone, as shown in FIG. 2*e*. The schematic for the circuit shown in FIG. 2*e* is functionally the same as the circuit shown in FIG. 2*d* but provides additional packaging flexibility because the inductor 72 is packaged separately from the battery 78 and from the power electronics 82. The switches s19 and s20 and a smaller capacitor C8 is part of the traction drive power electronics.

However, the topology 76 shown in FIG. 2*e* may produce arcing if an interconnection to the inductor 72 is broken. To reduce the potential for arcing, voltage suppressors may be provided.

FIG. 2*f* illustrates the same pseudo current source power converter topology as shown in FIG. 2*e* with additional protection against transient voltages. FIG. 2*f* provides metal-oxide varistors (MOVs) type suppression wherein arcing is a side effect of an open current formed at the inductor voltages rise quickly and needs to be suppressed. Additionally, suppression is provided to further prevent transients from propagating through an entire system such as a vehicle between the inductor 72 and at least one of the traction drive 66 defining the power electronics, the motor 68, and an alternative non-inductive load. Suppression operates to prevent transient voltage from exceeding a certain amount when the system is operating to regulate the voltage. At least one transient voltage suppressor across the inductor 72 may be provided. As shown in FIG. 2*f*, alternatively a plurality of voltage suppressors Z1, Z2, and Z3 are provided in parallel with the inductor 72. The suppressors Z1, Z2, and Z3 may be (MOVs) or other bi-directional transient-voltage clipping devices. It may not be necessary to include all three suppressing components. The suppressor may be installed as needed, depending the requirements of the system and associated cost limitations.

An alternative way to reduce arcing associated with the topology disclosed in FIG. 2*e* is to divert the magnetic energy stored within the inductor to another form, such as electric energy as shown the pseudo power source topology circuit 94 shown in FIG. 2*g*. At least one diode in combination with an additional capacitor C9 to accomplish the diversion of energy. Alternatively, a plurality of diodes, shown as four diodes D1, D2, D3, and D4 as shown in FIG. 2*g* are placed in parallel with the inductor 72 to rectify or shunt the magnetic energy in the inductor 72 to electric energy stored in capacitors C8 and/or C9. However, not all four diodes may be required. The necessity depends on both the current direction and, similar to the suppression components disclosed with respect to FIG. 2*e*, the port(s) associated with the topology requiring protection. In operation, to dissipate the electric energy stored in C9, the energy may be delivered to the traction drive and motor through an optional switch S28, wherein S28 may be replaced by a direct connection if necessary. Additionally, the energy stored in C9 may be diverted for use in another application or alternatively, may be dissipated in a resistor (not shown).

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A current source power converter topology comprising:
   an electric load;
   a stiff current source to power the electric load, wherein the stiff current source includes
   a voltage source,
   an inductor,
   a first switch, and
   a second switch, wherein each of the first and the second switches alternate between alternating open and closed positions and cooperate with the voltage source and further with the inductor to deliver a stiff but controllable current to the load;

a driver associated with the electric load having power electronics disposed therewithin to drive the electric load; and at least one capacitor coupled to the load and to the power electronics to prevent transients from damaging the current source power converter.

2. The current source power converter topology of claim 1, wherein the electric load comprises:
an electric motor.

3. The current source power converter topology of claim 2, comprising:
a traction drive defining the driver associated with the electric load to drive the electric motor.

4. The current source power converter topology of claim 3, further comprising:
at least one capacitor disposed between and in electrical communication with the electric motor and the traction drive to suppress transients that occur during cycling of the motor.

5. The current source power converter topology of claim 3, further comprising:
a plurality of capacitors disposed between and in electrical communication with the electric induction motor and the traction drive to suppress transients that occur during cycling of the motor, wherein each of the plurality of capacitors are associated with an associated phase of the electric induction motor.

6. The current source power converter topology of claim 1, wherein the inductor operates to regulate transients flowing through the power converter topology.

7. The current source power converter topology of claim 1, further comprising:
a third switch in electrical communication with the second switch; and
a fourth switch in electrical communication with the first switch, wherein the third and the fourth switches cooperate to provide a negative voltage current source to the electric load.

8. A pseudo current source power converter topology comprising:
an electric load;
a pseudo current source to power the electric load formed from a voltage source, a first capacitor in parallel with the voltage source, and an inductor coupled in series with the voltage source and further in series with the first capacitor wherein the inductor operates to hold a current delivered to the electric load stiff but controllable; and
a driver associated with the electric load having power electronics disposed therewithin to drive the electric load, wherein the power electronics has an associated first and a second switch and a second capacitor wherein when the first and second switches alternate between alternating open and closed positions and cooperate with the voltage source, the first capacitor, and the inductor to charge the second capacitor.

9. The pseudo current source power converter topology of claim 8, wherein when the second capacitor is charged, a voltage measured across the second capacitor is equal to a first voltage measured across the voltage source plus a second voltage measured across the inductor when the first switch is closed.

10. The pseudo current source power converter topology of claim 8, further comprising:
an electric motor.

11. The pseudo current source power converter topology of claim 10, comprising:
a traction drive defining the driver associated with the electric load to drive the electric motor.

12. A pseudo current source power converter topology comprising:
a battery formed from a voltage source having first capacitor connected in parallel with the voltage source, wherein the battery is packed within an associated first package;
an inductor coupled in series with the battery, wherein the inductor operates to hold a current delivered to an electric load constant, and wherein the inductor is in communication with the battery and is packaged within a second package; and
combination electric load and driver associated with the electric load packaged within a third package, wherein the driver has power electronics disposed therewithin to drive the electric load, and wherein the power electronics has an associated first and second switch, and a second capacitor wherein when the first and second switches alternate between alternating open and closed positions and cooperate with the voltage source, the first capacitor and the inductor to charge the second capacitor, wherein the electric load is packed within a third package in combination with the driver.

13. The pseudo current source power converter topology of claim 12, further comprising:
at least one metal oxide varistor connected in parallel with the inductor to suppress transient voltages.

14. The pseudo current source power converter topology of claim 12, further comprising:
a plurality of metal oxide varistors connected in parallel with the inductor to suppress transient voltages.

15. The pseudo current source power converter topology of claim 12, further comprising:
a third capacitor in electrical communication with the inductor; and
at least one diode in electrical communication with the third capacitor and connected in parallel with the inductor to rectify magnetic energy stored in the inductor to electric energy stored in the third capacitor.

16. The pseudo current source power converter topology of claim 12, further comprising:
a third capacitor in electrical communication with the induct or; and
a plurality of diodes in electrical communication with the third capacitor and connected in parallel with the inductor to rectify magnetic energy stored in the inductor to electric energy stored in the third capacitor.

* * * * *